(12) United States Patent
Kerf

(10) Patent No.: US 9,687,921 B2
(45) Date of Patent: Jun. 27, 2017

(54) CARBIDE CUTTING TOOL AND METHOD OF MAKING SUCH A TOOL

(75) Inventor: Gerard Kerf, Baelen (BE)

(73) Assignee: PRECICARB, Verviers (BE)

( * ) Notice: Subject to any disclaimer, the term of this patent is extended or adjusted under 35 U.S.C. 154(b) by 919 days.

(21) Appl. No.: 12/294,451

(22) PCT Filed: Mar. 26, 2007

(86) PCT No.: PCT/BE2007/000029
§ 371 (c)(1),
(2), (4) Date: Sep. 25, 2008

(87) PCT Pub. No.: WO2007/109866
PCT Pub. Date: Oct. 4, 2007

(65) Prior Publication Data
US 2010/0189519 A1  Jul. 29, 2010

(30) Foreign Application Priority Data
Mar. 28, 2006 (EP) .................................. 06447042

(51) Int. Cl.
*B23C 5/04* (2006.01)
*B02C 18/18* (2006.01)
*B23C 5/22* (2006.01)

(52) U.S. Cl.
CPC .............. *B23C 5/04* (2013.01); *B02C 18/186* (2013.01); *B23C 5/22* (2013.01); *B23C 2224/24* (2013.01); *B23C 2224/32* (2013.01); *B23C 2224/36* (2013.01); *B23C 2226/18* (2013.01); *Y10T 407/1934* (2015.01); *Y10T 407/1942* (2015.01); *Y10T 407/27* (2015.01)

(58) Field of Classification Search
CPC ........... B02C 18/186; B23C 5/04; B23C 5/22; B27G 13/04; Y10T 407/1934; Y10T 407/1942; Y10T 407/191
USPC ........ 407/21, 22, 23, 24, 25, 26, 27, 28, 29, 407/58; 83/674, 672, 698.41, 340
See application file for complete search history.

(56) References Cited

U.S. PATENT DOCUMENTS 523,876 A * 7/1894 Anderson et al. ............ 241/295
553,280 A * 1/1896 Dupes ........................... 144/227
593,500 A * 11/1897 Tillison ......................... 144/230
(Continued)

FOREIGN PATENT DOCUMENTS

DE  10 2004 017 714 A1   6/2005
FR        1278615        12/1961
(Continued)

OTHER PUBLICATIONS

English Translation of FR2462223.*

*Primary Examiner* — Jennifer Swinney
(74) *Attorney, Agent, or Firm* — Reinhart Boerner Van Deuren P.C.

(57) ABSTRACT

The present invention concerns a rotary cutting tool (1) with a cylindrical supporting spindle (2) and several individual blades (3) with essentially radial cutting edges, helically ground and set at regular intervals on the outer surface of the spindle, each blade (3) having a rectilinear base (4) which inserts into a slot (5) of the same shape as said base, each individual blade (3) being mechanically fixed to the spindle (2), characterized in that it also comprises two covers (8, 9) fixed to the respective bases (8', 9') of the spindle (2) so as to reinforce the fixing of the blades (3).

18 Claims, 6 Drawing Sheets

(56) References Cited

U.S. PATENT DOCUMENTS

| | | | | |
|---|---|---|---|---|
| 604,776 | A | * | 5/1898 | Morton ................ B23C 5/2221 144/230 |
| 632,618 | A | * | 9/1899 | Anderson .............. B27G 13/04 144/230 |
| 959,104 | A | * | 5/1910 | Barker ................ B23C 5/2295 144/115 |
| 1,148,597 | A | * | 8/1915 | Lewis ..................... B23C 5/22 144/230 |
| 1,432,792 | A | * | 10/1922 | Schimmel ..................... 144/230 |
| 1,874,536 | A | * | 8/1932 | Irwin ................... B23P 15/34 407/24 |
| 2,212,012 | A | * | 8/1940 | Davidson ........................ 407/45 |
| 2,310,826 | A | * | 2/1943 | Adams ............................ 407/25 |
| 2,498,721 | A | * | 2/1950 | Stafford ......................... 407/25 |
| 2,567,167 | A | * | 9/1951 | Drader ........................... 407/25 |
| 2,706,848 | A | * | 4/1955 | Riley ............................. 407/25 |
| 3,251,256 | A | * | 5/1966 | McGrath ......................... 83/674 |
| 3,672,017 | A | * | 6/1972 | Nielsen et al. ................. 407/49 |
| 3,688,368 | A | * | 9/1972 | Johann Bodem ............... 407/25 |
| 3,740,808 | A | * | 6/1973 | Shioya ............................ 407/25 |
| 3,785,417 | A | * | 1/1974 | Vora ............................... 144/221 |
| 4,205,932 | A | * | 6/1980 | Tennutti ......................... 407/25 |
| 5,232,316 | A | * | 8/1993 | Tennutti ......................... 407/23 |
| 5,253,561 | A | * | 10/1993 | Wynn ............................. 83/674 |
| 5,586,843 | A | | 12/1996 | Minicozzi |
| 6,367,523 | B1 | * | 4/2002 | Hu ................................. 144/230 |
| 6,386,250 | B1 | * | 5/2002 | Liu ................................. 144/231 |
| 6,997,650 | B2 | * | 2/2006 | Voigt et al. .................... 407/35 |

FOREIGN PATENT DOCUMENTS

| | | | | |
|---|---|---|---|---|
| FR | 2 301 327 | | 9/1976 | |
| FR | 2462223 | A * | 3/1981 | |
| GB | 923087 | | 4/1959 | |
| GB | 1 334 676 | | 10/1973 | |
| GB | 1 485 742 | | 9/1977 | |
| GB | 2 116 094 | A | 9/1983 | |
| GB | 2116094 | A * | 9/1983 | ............. B23F 21/16 |
| GB | 2 364 007 | A | 1/2002 | |
| JP | 54158795 | A * | 12/1979 | ............. B23F 21/16 |
| JP | 2000-107925 | A | 4/2000 | |

* cited by examiner

SECTION BB

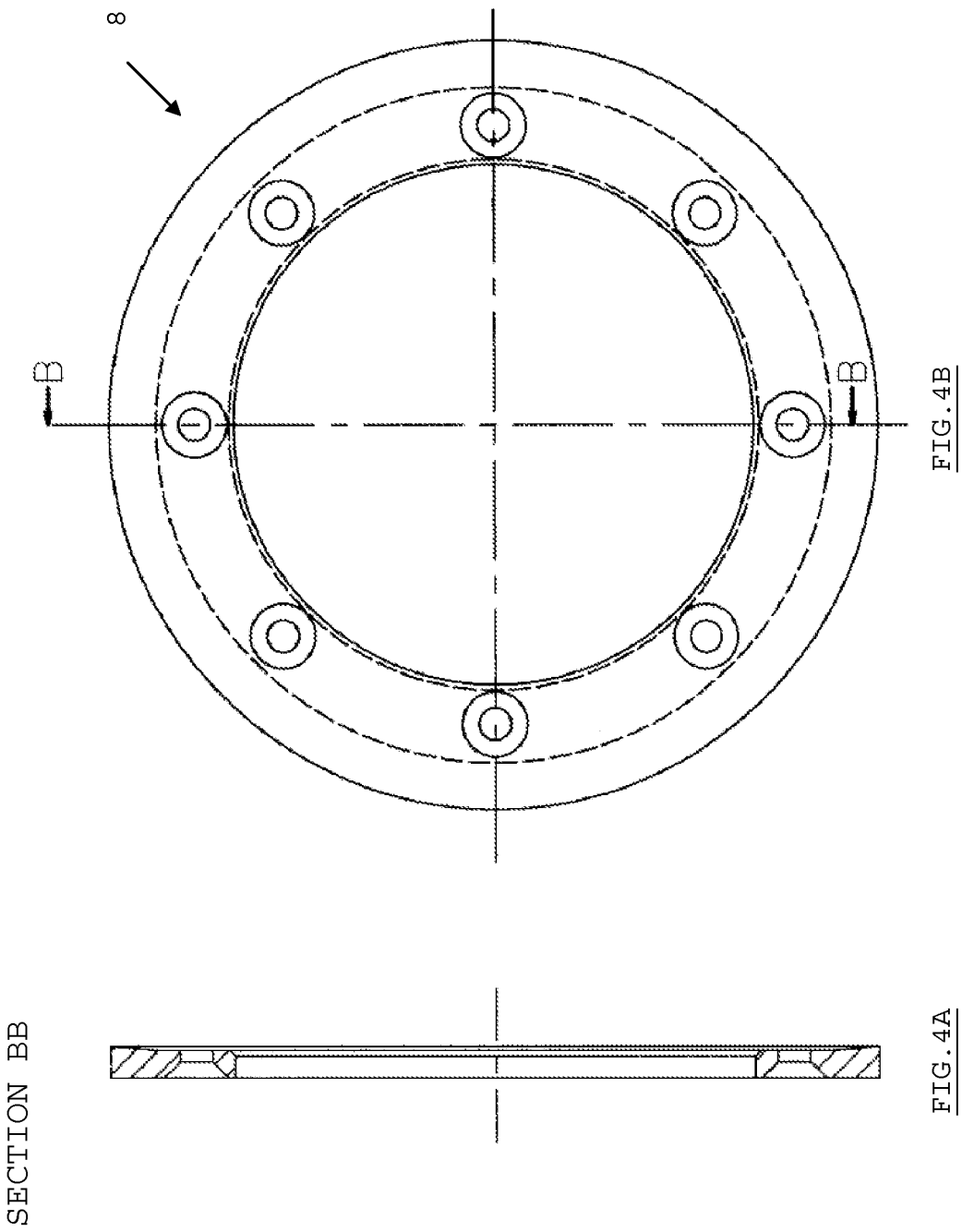

CARBIDE CUTTING TOOL AND METHOD OF MAKING SUCH A TOOL

CROSS-REFERENCE TO RELATED PATENT APPLICATIONS

This patent application is the National Stage of International Application No. PCT/BE2007/000029, filed Mar. 26, 2007, that claims the benefit of European Application No. 06447042.0, filed Mar. 28, 2006, the entire teachings and disclosure of which are incorporated herein by reference thereto.

SUBJECT OF THE INVENTION

The present invention concerns a cutting tool with knives or blades with increased resistance to wear, in particular for cutting any synthetic or mineral material in a thread (plastic, glass fibre etc.), coated or not, into granules before using it as a raw material.

The invention concerns a rotary cutting tool with several individual cutting edges set at regular intervals or not around an axis.

The invention also concerns a method of making such a tool.

STATE OF THE ART AND SETTING OF THE PROBLEM

In the manufacture or recycling of plastic materials, for example, granulators are known that comprise an extruder or a spool that work according to a "mincing" principle. In the case of the extruder, the plastic material is heated and the molten mass is pushed through a disc with holes.

The emerging threads are then cut into granules by rotary blades. The cutting edges of these blades are generally helical for a better distribution of the load and to avoid vibrations, the threads being then cut successively and not simultaneously.

The state of the art proposes numerous knife applications of this type with helical grinding of the blades. These may be machined from solid blocks, that is, the piece is a monobloc made from high-speed high-alloy or sintered steel with a Rockwell hardness C at least greater than 60 (for example GB-A-2 364 007, FR-A-2 301, 327, GB-A-923 087, JP-A-2000/107925). They may also be presented in the form of plates made in a material highly resistant to wear such as tungsten carbide, high-speed steel or ceramics, which might be coated. In that case, the cutting plates are fixed to the body of the cutting tool by brazing, crimping or clamping, non-metallic sticking etc. (for example U.S. Pat. No. 5,586,843, GB-A-1 334 676, GB-A-2 116 094).

Commercially, there are cutting tools and counter blades of this type with diameters of between 50 and 200 mm and lengths of between 50 and 600 mm, either monobloc made of treated steel or special alloys or brazed plates made of carbide on the market.

In the case of the above mentioned granulators used in production, it is necessary to replace the worn monobloc cutting tools up to several times a day, which increases the downtimes of the production tool and puts a strain on productivity (up to several hours of downtime a day). The use of carbide, especially in the form of monobloc tools, allows the working life of the cutting tool to be increased by 5 to 10 times. However, monobloc tools produced by sintering are expensive and the deterioration of a single blade entails the replacement of the whole tool.

Moreover, in the case of cutting tools for granulators, the knives with helical cutting edges are set axially along the whole length of the support cylinder body. The positioning and fixing of the individual blades on said body are extremely delicate operations given the tolerance to be observed for the final grinding, all the more so for helical blades.

Document U.S. Pat. No. 2,212,012 discloses rotary knives with individual blades inserted in slots machined to the outer surface of these knives. The blades and the corresponding slots have a rectilinear base. The cross-section of the blades is essentially rectangular, the grinding being helical.

Document FR-A-1 278 615 discloses a cutter made of a cylindrical piece equipped with straight cut slots bent relative to the cylinder's generator, in which blades in the form of rods are set. The cutting edges are set at regular intervals around the perimeter of the cutter body.

Document DE 10 2004 017 714 A1 describes a cutting tool with rectilinear slots set at an oblique angle to the tool's axis. The blades are attached to the tool by means of longitudinal locking pieces blocked by means of screws.

AIMS OF THE INVENTION

The present invention aims to provide a solution that will permit the disadvantages of the state of the art to be overcome.

In particular, the invention aims to provide a cutting tool for a granulator whose working life is significantly increased.

The invention also aims to provide a cutting tool which is less expensive than the tools of the state of the art in terms of manufacture and repair.

A further aim of the invention is to provide a simple and economical method of making and grinding the cutting tool according to the invention.

MAIN CHARACTERISTIC FEATURES OF THE INVENTION

A first aspect of the present invention concerns a rotary cutting tool with a cylindrical supporting spindle and several individual blades with essentially radial cutting edges, helically ground and set and regular intervals on the outer surface of the spindle, each blade having a rectilinear base which inserts into a slot of the same shape as said base, each individual blade being mechanically fixed to the spindle, characterized in that it also comprises two covers fixed to the respective bases of the spindle to reinforce the fixing of the blades.

According to a first preferred embodiment of the invention, the base is essentially rectangular or is shaped like a parallelogram and the slot is respectively rectangular or a parallelogram.

As an advantage, the mechanical fixing of the blades to the spindle is achieved by screwing, tightening, brazing, shrinking, crimping or sticking.

A further preference is for the blades to be fixed by being screwed to the spindle by means of cone-headed screws.

A further preference is for the spindle to have blade supports equipped with evenly-spaced transverse slots for positioning the screws.

As an advantage, the screws are set at regular intervals along the blades, in the blade supporting slots, so as to lock them by means of the screw heads in the corresponding rectilinear slots.

Still according to the invention, the blades extend over the entire length of the spindle with a constant and regular cutting profile without any teeth anywhere on the whole length of the blades.

According to a preferred embodiment of the invention, the slots machined in the spindle are set at an angle of between 0° and 15° and preferably between 5° and 15° relative to the axis of the spindle.

As an advantage, the blades are made of cemented carbide based on tungsten carbide, high-speed steel or high-strength steel, diamond, ceramics or cermet, possibly covered with mono- or multilayered titanium nitride or titanium aluminium nitride, titanium carbonitride or chromium nitride.

As a further advantage, the spindle is made of stainless steel.

According to a particularly advantageous embodiment, each blade has at least two cutting edges parallel to the helical grinding.

The blades have preferably at least one cone-headed end that fits into an inverted taper made into the corresponding cover during the fixing.

Preferably also, at least one of the two covers is split radially and has a screw hole between any two splits so that there is a maximum of two cutting edges between any two splits.

According to a second preferred embodiment of the invention, the above mentioned slot has a trapezoidal cross-section, the wide base of the trapeze being closer to the axis of the spindle than the narrow base.

As an advantage, the spindle has movable locking parts in the form of rods of the same length as the blades, which can be set axially along the latter and which form slots when they are in position, said locking parts comprising spaces for inserting screws for fixing to the spindle.

Each locking part is preferably configured for the fixing of two adjacent blades.

A second aspect of the present invention concerns a method of making a rotary cutting tool as in any of the preceding claims, characterized at least by the following successive stages:
- blanks of blades with a rectilinear base are machined;
- the blanks of the blades with a rectilinear base are positioned in the corresponding slots machined in the spindle;
- the blanks of the blades are mechanically fixed to the spindle, preferably by means of cone-headed screws, as well as the covers;
- the blanks of the blades are machined so as to obtain finished blades whose helical grinding meets the predetermined global tolerances of the cutting tool.

BRIEF DESCRIPTION OF THE FIGURES

FIGS. 4A and 4B show respectively a cross-section view and a plan view of the cover corresponding to the base in FIG. 3A.

DESCRIPTION OF PREFERRED EMBODIMENTS OF THE INVENTION

Figure 1:
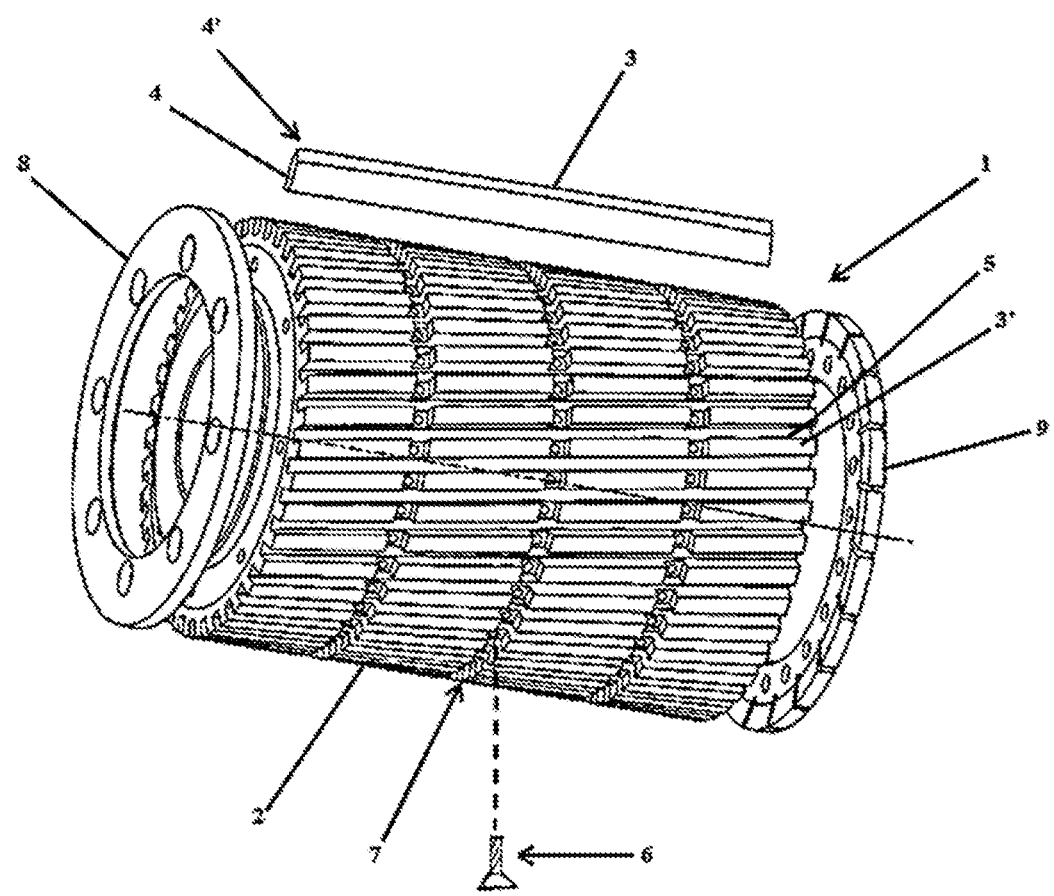
FIG. 1 shows an exploded perspective view of the cutting tool according to a preferred embodiment of the present invention.

As shown in FIG. 1, the cutting tool 1 according to a first preferred embodiment of the invention comprises a cylindrical spindle 2 supporting blades, made for example of ordinary steel or stainless steel. The blades 3, on the other hand, are made of a material with great resistance to wear such as, for example, tungsten carbide (WC), ceramics, high-speed steel etc., possibly coated with titanium nitride (TiN), titanium carbonitride (TiCN), titanium aluminium nitride (TiAlN), chromium nitride (CrN) etc.

The rough blades or blade blanks (not shown) are essentially in the form of rectangular parallelipeds or bars with rectilinear bases that are roughly ground and fixed on the side surface of the cylindrical spindle 2 in slots 5 by mechanical means, for example by locking by means of cone-headed screws 6. The blades 3 are orientated parallel to each other at an angle of about 10 degrees relative to the axis of the cylinder 2. This angle will allow the grinding blades with a helical finish to have a spiral angle greater than the blades positioned axially.

Figure 2A:
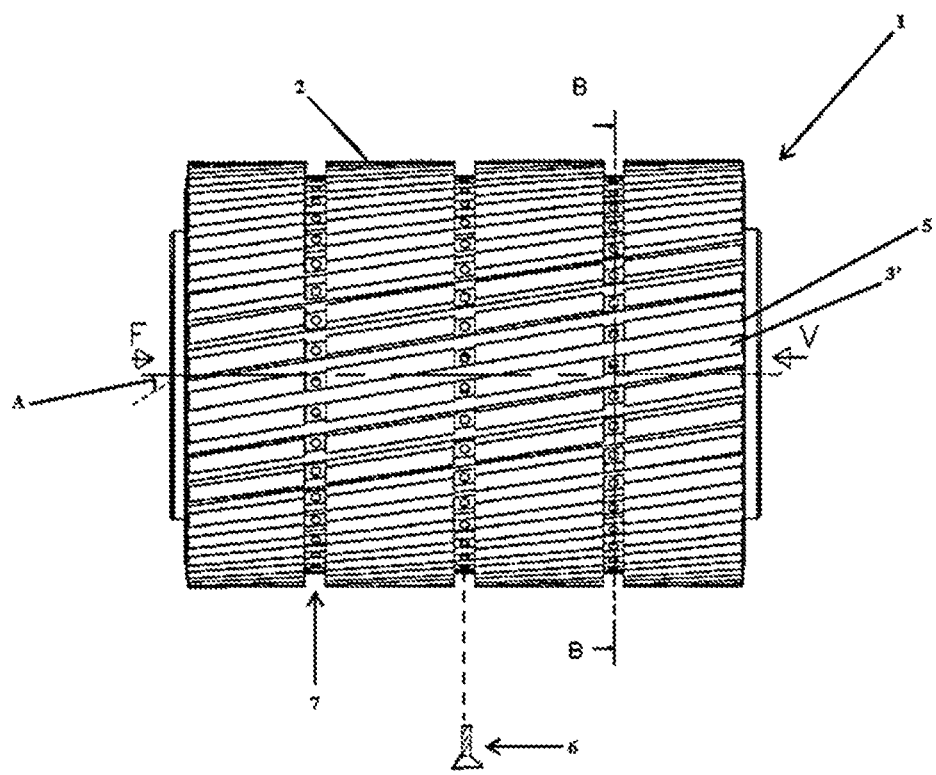
FIGS. 2A and 2B show respectively an elevation view and a cross-section view of the supporting spindle of the cutting tool as in FIG. 1.
Figure 2B:
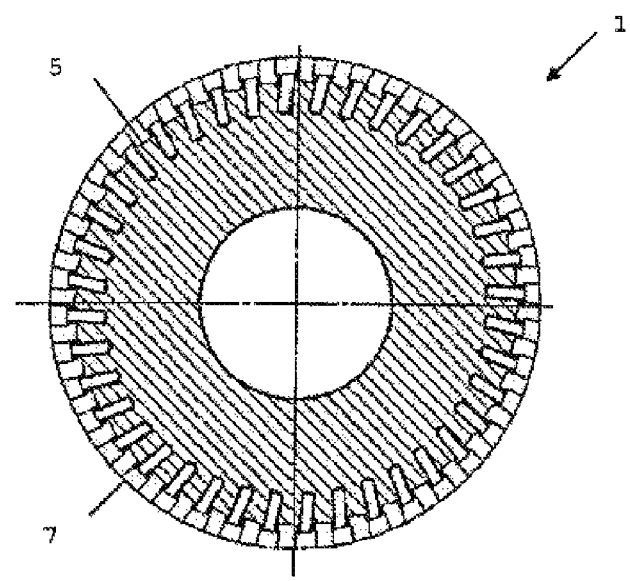
Figure 3B:
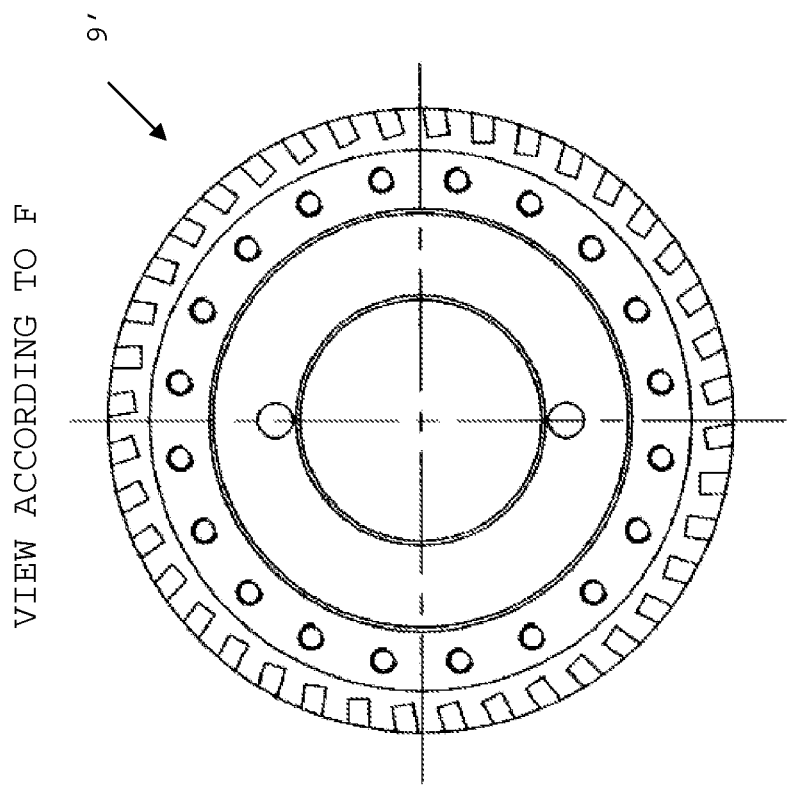
FIGS. 3A and 3B show respective views of the bases of the above-mentioned spindle.
Figure 3A:
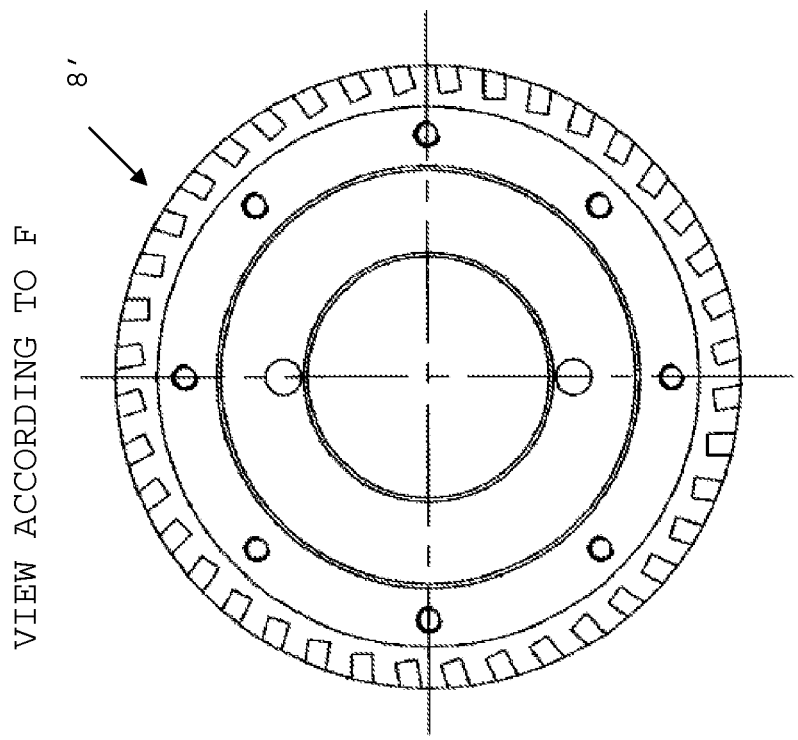

The spindle 2 is equipped with several rectilinear, flat-bottomed slots 5, allowing the blanks of the blades 3 to be fixed, said blades having bases 4 of a corresponding shape, that is, rectangular or in the shape of a parallelogram (FIGS. 1, 2A and 2B). Once these are fixed to the spindle, it is then easy to do the final grinding of the blades in accordance with the required tolerances.

Between the slots, the spindle 2 therefore shows blade supports 3' that themselves show several, for example three, transverse slots 7 evenly spaced and allowing the insertion of the above-mentioned cone-headed screws 6.

The invention is not restricted to the fixing of the blanks of the blades by screws but rather any mechanical means such as crimping, tightening, hot shrinking, clamping, brazing, sticking etc. may be considered within the limits of the invention.

As an advantage, the blanks of the blades 3 and the spindle 2 may be sized in such a way that a blade with two cutting edges (not shown) may be inserted across the width of the rectilinear slots 5 machined in the spindle.

According to a preferred embodiment of the invention, the fixing of the blades 3 is reinforced by the additional fixing of two covers 8, 9 with inverted tapers relative to the bases 8', 9' of the spindle 2.

The blades 3 therefore have at least one cone-headed end 4' which fits, when the whole is fixed, into an inverted taper machined into the corresponding cover 8.

Figure 5A:
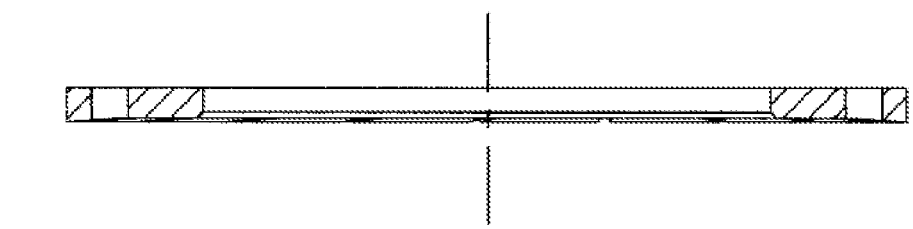
FIGS. 5A and 5B show respectively a cross-section view and a plan view of the cover corresponding to the base in FIG. 3B.
Figure 5B:
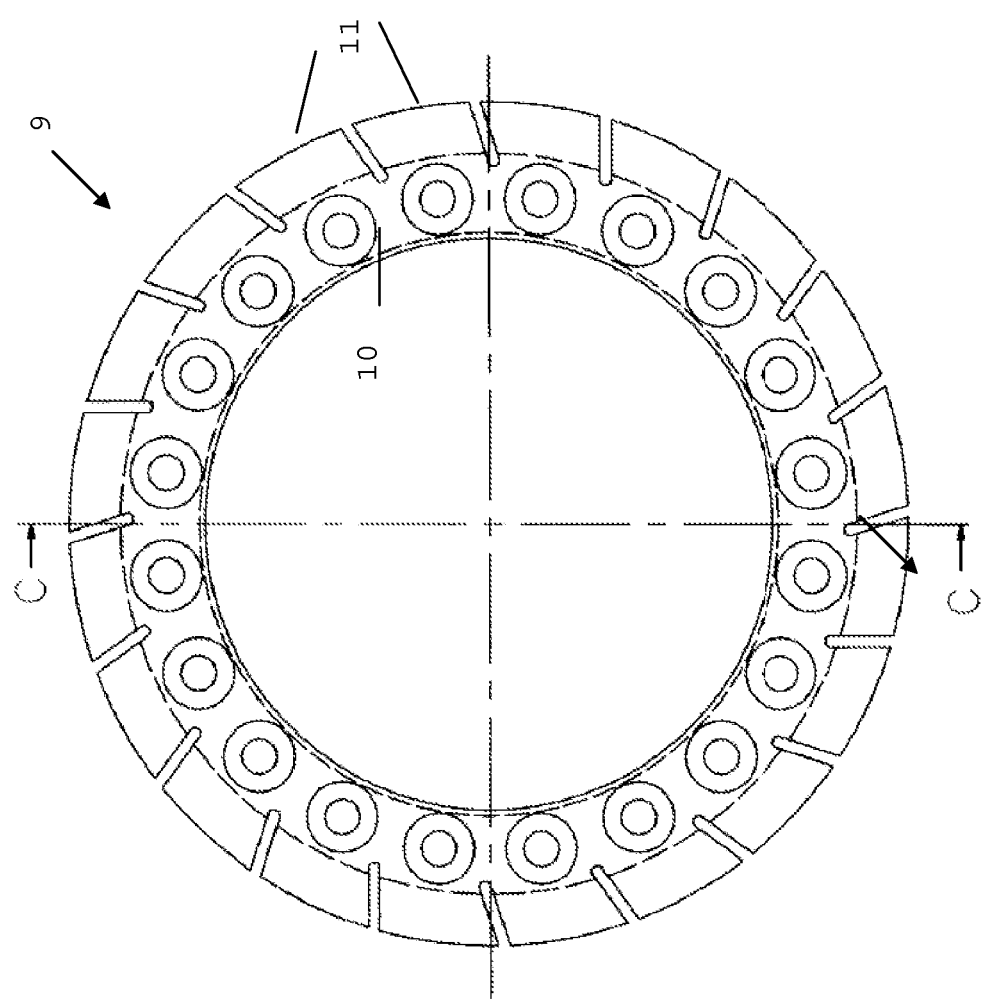

In order to cover the entire length of the blades, at least one of the two covers (cover 9, FIGS. 1 and 5B) is split radially and shows a screw hole 10 between any two splits 11 in such a way that there is a maximum of two blades between two splits, given what is explained here. These arrangements allow to counteract the exit of the rotating knife under the action of the centrifugal force.

Figure 6:
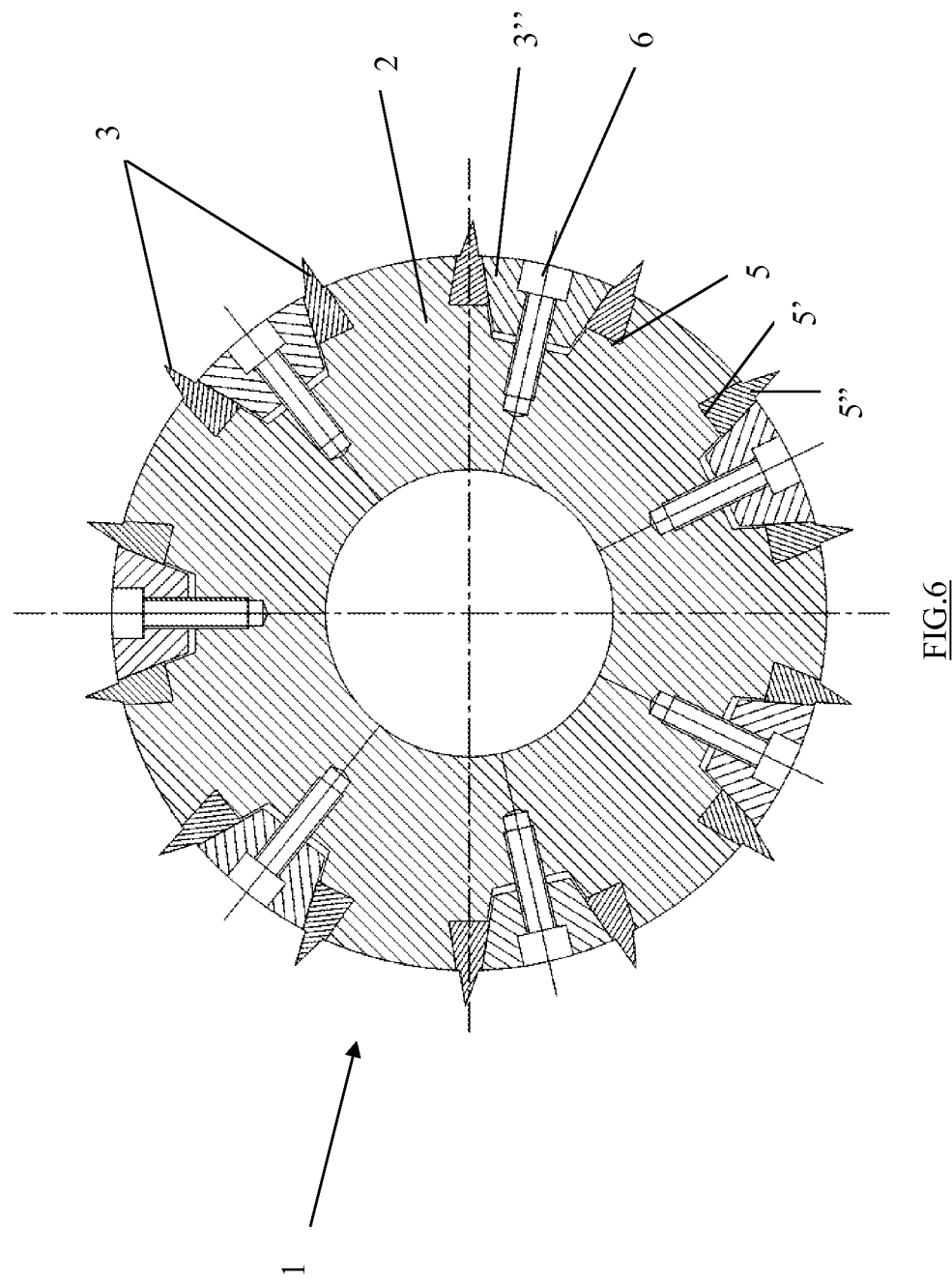
FIG. 6 shows a cross-sectional view of one embodiment of the cutting tool according to one aspect of the present application.

According to a second preferred embodiment of the invention shown in FIG. 6, the slots 5 are of trapezoidal cross-section, the wide base of the trapeze 5' being closer to the axis of the spindle 2 than the narrow base 5". Thus, the secure fixation of the blades 3 is further reinforced, said blades having a tendency to be ejected when the spindle is moving as a result of the centrifugal force. As an advantage, the spindle 2 is then designed to take movable locking parts 3" presented in the form of bars of the same lengths as the blades 3 that can be set axially along the blades 3 and form slots 5 when they are in position. Shoulders are cut into the spindle and the blades 3 are placed against said shoulders. The locking parts 3' of the blades also have spaces for inserting fixing screws 6 on the spindle 2. These fixing screws may be of any type well known to the person skilled in the art.

In applications where the angular pitch between the blades may be sufficiently wide, a locking part 3' may be provided for fixing two adjacent blades 3, as shown in FIG. 6.

The invention shows the following advantages.

The use of carbide allows the working life of the blades to be greatly increased and therefore reduces the production downtimes.

The blades are interchangeable and movable. Because of the individual fixing of each blade to the blade support, any defective blade may be separately replaced, which considerably reduces the cost of repair compared with a monobloc device. Moreover, each tool may be supplied with two sets of blades.

The cost of machining a spindle and separate bars is less than that of a monobloc piece.

The fact that the blades are movable is taken into account with regard to the effect of the centrifugal force by appropriate measures (reinforcement covers, trapezoidal slots narrowing towards the outside of the spindle).

The invention claimed is:

1. Rotary cutting tool (1) with a cylindrical supporting spindle (2) and several individual blades (3) with axial cutting edges, helically ground and set at regular intervals around an outer surface of the spindle, each individual blade (3) having a base (4) which inserts into one of a plurality of slots (5) of the same shape as said base, the slots (5) being machined in the spindle (2), each individual blade (3) being mechanically fixed to the spindle (2), two covers (8, 9) fixed to two respective bases (8', 9') of the spindle (2) so as to reinforce the fixing of the individual blades (3), characterized in that the blades are attached to the spindle (2) by means of cone-headed screws (6) and in that the spindle (2) is equipped with transverse slots (7) evenly spaced and receiving the screws (6) therein, and wherein the transverse slots (7) extend circumferentially around the spindle (2) and interconnect the plurality of slots (5), wherein each transverse slot (7) extends in a continuous circular path around an outer circumference of the spindle; wherein the screws (6) extend transversely and non-parallel to a central axis of the spindle and into an outer radial periphery of the spindle, and wherein between the slots (5), the spindle (2) provides a plurality of blade supports (3') extending lengthwise between the two respective bases (8', 9'), with each of the transverse slots (7) being aligned with and between the blade supports (3') with end to end pairs of blade supports (3') defining the transverse slots (7).

2. Tool as in claim 1, characterized in that the base (4) is rectangular or a parallelogram and that the slot (5) has respectively a rectangular or parallelogram-shaped cross-section.

3. Tool as in claim 1, characterized in that the mechanical fixing of the blades (3) to the spindle is achieved by screwing, tightening, brazing, shrinking, crimping or sticking.

4. Tool as in claim 1, characterized in that the screws (6) are set at regular intervals along the blades (3), in the transverse slots (7) between the end to end pairs of the blade supports (3'), in such a way as to lock the blades (3) into the slots (5), by a head of the screws (6).

5. Tool as in claim 1, characterized in that the blades (3) extend along the entire length of the spindle (2) with a constant and regular cutting profile without any teeth anywhere on the whole length of the blades (3).

6. Tool as in claim 1, characterized in that the slots (5) machined into the spindle (2) are set at an angle (A) of between 0° and 15°.

7. Tool as in claim 1, characterized in that the blades (3) are made of cemented carbide based on tungsten carbide, high-speed or high-strength steel, diamond, ceramics or cermet, coated with mono-or multilayered titanium nitride, titanium aluminium nitride, titanium carbonitride or chromium nitride.

8. Tool as in claim 1, characterized in that the spindle (2) is made of stainless steel.

9. Tool as in claim 1, characterized in that at least one of the two covers (9) is split radially and includes a screw hole (10) between any two splits (11) in such a way that there is a maximum of two cutting edges between any two splits (11).

10. Tool as in claim 1, characterized in that the slot (5) has a trapezoidal cross-section, the wide base (5') of the trapeze being closer to the axis of the spindle (2) than the narrow base (5").

11. Tool as in claim 1, wherein each transverse slot (7) comprises individual slot segments, each individual slot segment is open to and connects between a selected two of the slots (5).

12. Tool as in claim 1, wherein the screws (6) are received in the transverse slots (7); and each individual screw (6) provides a tightening force acting upon a selected two of the individual blades (3).

13. Tool as in claim 1, wherein the screws (6) in the transverse slots apply a tightening force to secure the blades (3) in the slots (5).

14. Tool as in claim 1, wherein the slots (5) are defined between the blade supports (3'), and wherein the transverse slots (7) are formed into the blade supports (3'), each transverse slot (7) comprising individual slot segments, each individual slot segment being open to and connecting between a selected two of the slots (5).

15. Method of making a rotary cutting tool as in claim 1, characterized at least by the following successive stages:
    blanks of blades with a base (4) are machined;
    the blanks of the blades with a base (4) are positioned in the corresponding slots (5) machined in the spindle (2);
    the blanks of the blades are mechanically fixed to the spindle (2), by cone-headed screws (6), as well as the covers (8,9);
    the blanks of the blades are machined so as to obtain finished blades (3) with helical grinding to provide for the cutting tool.

16. Rotary cutting tool (1) with a cylindrical supporting spindle (2) and several individual blades (3) with axial cutting edges, and set at regular intervals around an outer surface of the spindle, each individual blade (3) having a base (4) which inserts into one of a plurality of slots (5) of the same shape as said base, the slots (5) being machined in the spindle (2), each individual blade (3) being mechanically fixed to the spindle (2), characterized in that the blades are attached to the spindle (2) by screws (6), and wherein each screw (6) provides a tightening force acting upon a selected two of the individual blades (3) for securing the blades to the spindle (2), wherein the spindle is equipped with transverse slots (7) evenly spaced for the positioning of the screws (6), and wherein the transverse slots (7) extend circumferentially around the spindle (2) and interconnect the plurality of slots (5), and wherein each transverse slot (7) comprises individual slot segments, each individual slot segment is open to and connects between a selected two of the slots (5), and wherein the screws (6) extend transversely and non-parallel to a central axis of the spindle and into an outer radial periphery of the spindle, the screws being positioned in the transverse slots (7), and wherein between the slots (5), the spindle (2) provides a plurality of blade supports (3') extending lengthwise between the two respective bases (8', 9'), with each of the transverse slots (7) being aligned with and between the blade supports (3') with end to end pairs of blade supports (3') defining the transverse slots (7).

17. Tool as in claim 16, wherein each transverse slot (7) extends in a continuous circular path around an outer circumference of the spindle.

18. Tool as in claim 16, characterized in that the tool (1) also comprises two covers (8, 9) fixed to two respective bases (8', 9') of the spindle (2) so as to reinforce the fixing of the individual blades (3).

* * * * *